May 28, 1957  F. S. HULING  2,793,695
RECORD PUNCHING MACHINE
Filed Oct. 14, 1954  4 Sheets-Sheet 4

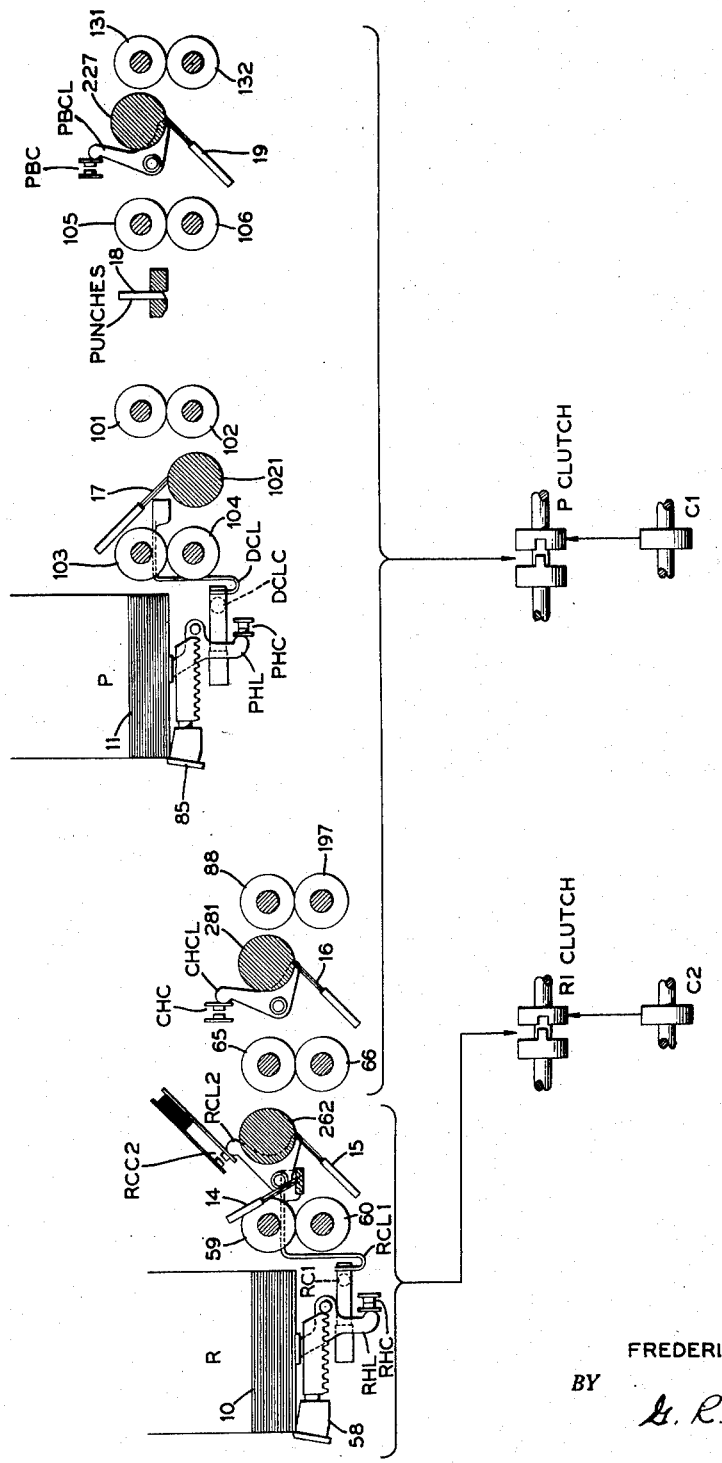

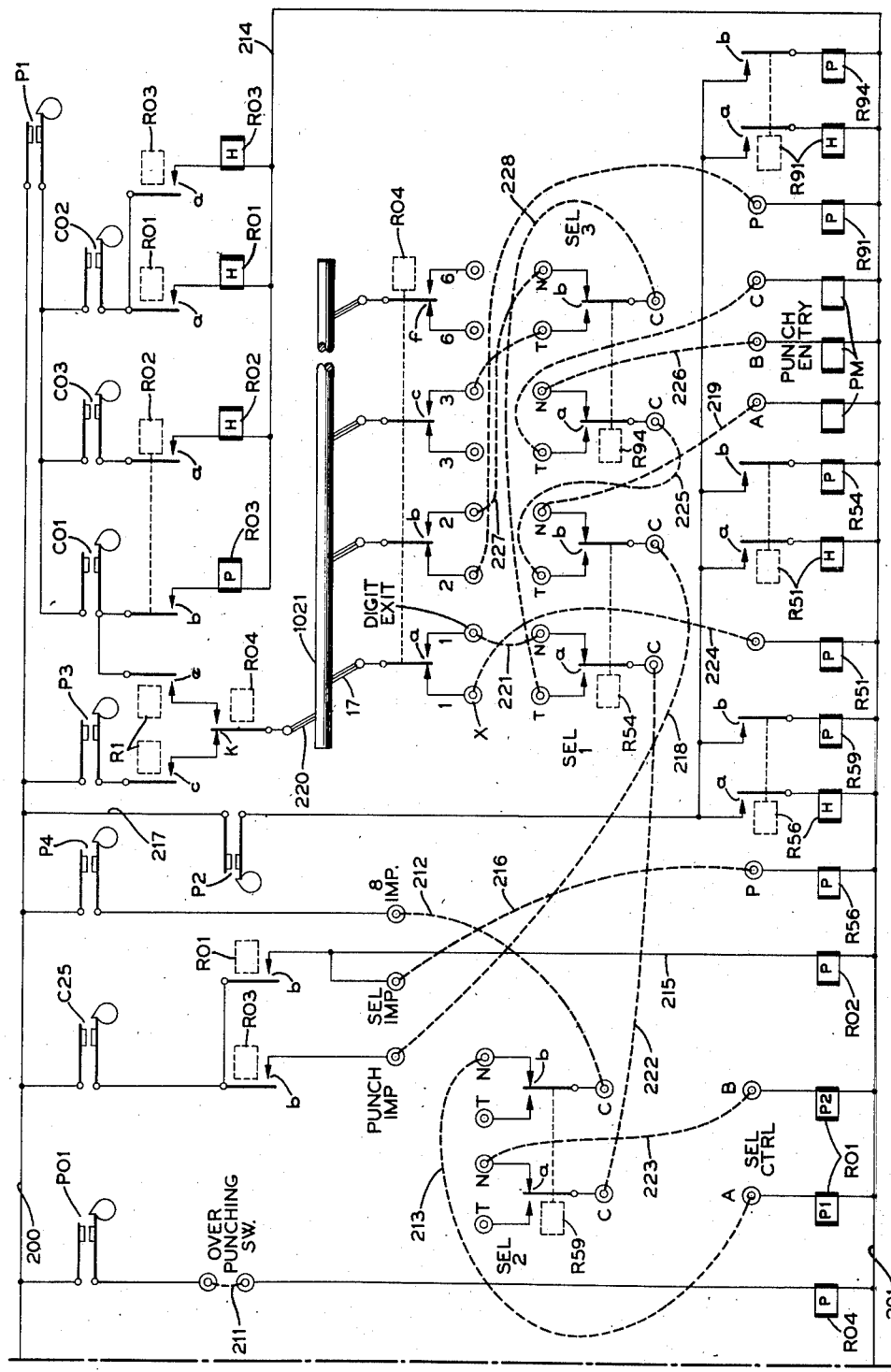

United States Patent Office 2,793,695
Patented May 28, 1957

2,793,695

RECORD PUNCHING MACHINE

Frederick S. Huling, Binghamton, N. Y., assignor to International Business Machines Corporation, New York, N. Y., a corporation of New York Application October 14, 1954, Serial No. 462,141

12 Claims. (Cl. 164—115)

This invention relates to punching machines and more particularly to the card controlled type which provides for selective punching of data on one card which is taken or transferred from the same card.

The present invention consists of an improvement designed to provide a plurality of columns of overpunchings in a ledger card which will reflect the status of a customer's account and which is particularly useful in customer billing applications. A typical application appears in the book-of-the-month type of business where every time a book is mailed to a customer an associated record card receives a punching. These record cards are arranged by customer and each card will receive a punching in the next higher punching position in a selected column of the card as books are mailed out. The punching indicates how many books have been shipped to a particular customer. For example, if the highest punched position in the selected column is 6, there is a total of four punches (9, 8, 7, 6) in that column indicating that four books have been shipped to that customer.

As payments are received for the books, the same type of overpunching operation is repeated in a different field of the associated customer cards. These cards can then be passed through another type of record controlled accounting machine which is used to prepare the customer bills. A check is made to determine how many payments are lacking by matching the punchings made for books shipped against the punchings made for payments received and the result obtained determines the "amount due" that will be printed on the customer bill by the accounting machine. Since the present invention is only concerned with the punching of the customer cards, only the punching machine need be discussed in the description that follows.

The present invention, solely as a convenience in disclosure of the invention, has been shown in the drawings and will be described hereinafter as applied to a reproducing machine of the type disclosed in Patent No. 2,032,805.

In the illustrative embodiment of the invention only the punch side of the reproducing machine is used and the sensing of the cards is done by the punch master brushes which are disposed three cycle points or the equivalent of three punching positions on the card in advance of the punch station. In the instant application three class selection devices are arranged for cooperation with the punch master brushes and means are provided for selectively interconnecting said devices to form the novel circuitry for carrying out the functions of the present invention. It is to be understood that the present invention is not limited to the use of three class selection devices but that any number may be used depending upon how many columns of punchings are desired. Class selection devices 1 and 3, under control of the master brushes, control the punchings in three columns, for example, columns A, B and C; while class selection device 2, under control of timed impulses, serves to prevent repetitive punching in any of said columns. Column A will first receive the digit punchings 9 through 11 during successive passes through the machine. After the 11 position in column A has been punched, the next passage of the card through the machine will cause selection device 1 to transfer and thereafter column B will receive the digit punchings 9 through 11. After the 11 position in column B has been punched, the next passage of the card through the machine will cause selection devices 1 and 3 to transfer and thereafter column C will receive the digit punchings. In the case of a blank card, a series of relays are picked through selection device 2 which in turn complete a circuit through selection device 1 to automatically punch the digit "9" in column A to start the sequence of operations described above.

An object of the present invention is to provide means whereby each time a card is run through the machine, the highest punched position in the column punched will be read and the punching mechanism controlled to automatically punch the next higher position in that column.

Another object of the present invention is to provide means whereby, when a blank card is run through the machine, the punching mechanism will be controlled to automatically punch the lowest punching index position of a selected column in that card.

A still further object of the present invention is to provide means whereby when a card passing through the machine has a predeterminead number of punching positions of a selected column already punched, the punching mechanism will be controlled to automatically punch the lowest punching index position of another column, such as, for example, the next adjacent column.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a diagrammatic view showing the particular card feeding mechanism associated with each of the clutches of the punching machine along with the various analyzing stations and the punching station.

Figs. 2a and 2b taken together form a wiring diagram of the machine.

Figure 2A:
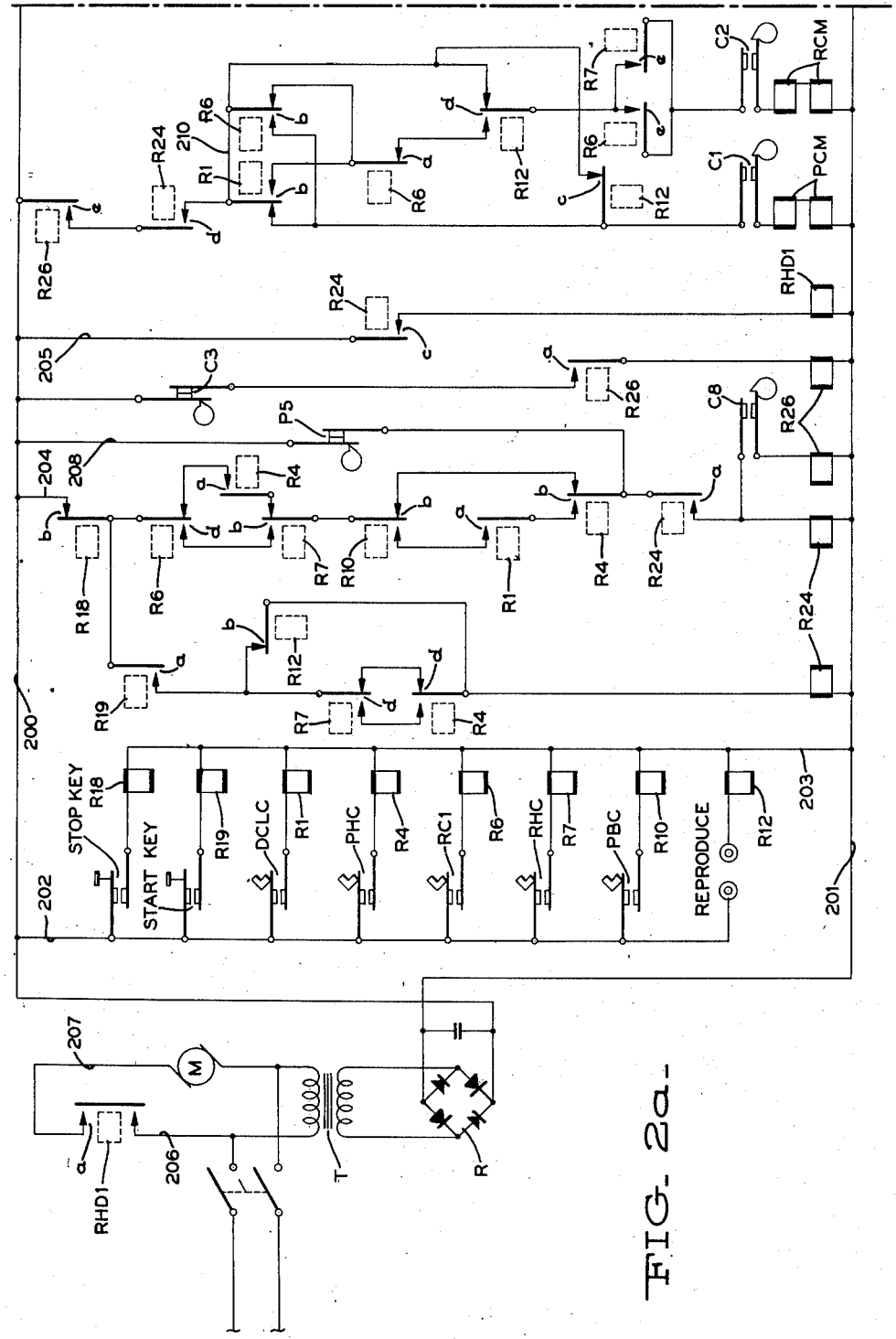

The present improvements are preferably incorporated in the form of card perforating machine fully shown and described in the Patent No. 2,032,805 to C. D. Lake, dated March 3, 1936.

Such a card perforating machine is known in the art as the IBM Reproducing Punch and its structure is so well known that it is deemed repetitious and unnecessary to repeat herein the complete description of the mechanical structure of the machine. Accordingly, in the following description, only a brief explanation will be given of the construction and operation of the machine as far as it pertains to the present invention.

To obtain further details of construction and operation of the illustrative machine, reference may be had to the afore-mentioned patent.

A general idea of the operation of the punching machine to which the present invention is applied may be gathered by observing the diagrammatic view shown in Fig. 1. There it is noted that there are a number of pattern cards 10 in the hopper R and another bunch of blank record cards 11 in the hopper P. The cards are fed singly but concurrently from both hoppers and are then shifted in synchronism across sensing and punching stations before being deposited in stackers.

The pattern card 10 encounters first master sensing brushes 14, then a set or line of sensing brushes 15, and then a series of checking brushes 16. The record card 11 passes the master brushes 17, then a line of punches 18 and then the set of checking brushes 19.

The brushes 14 cooperate with a special perforation position on the original or pattern card 10 and when such a perforation is sensed a class selection operation may take place to shift the sensed data to a selected field on the record card. The brushes 17 are used for field selection of gang punching and also for control of suspension of pattern card feeding when operating for combined-gang punching and reproducing.

There are electrical connections between the brushes 15 and the punches 18, so that when a perforation is sensed in a pattern card 10 a corresponding perforation is punched in the related record card 11. For this type of operation both the R1 and P clutches would be energized.

When the machine is used for straight gang punching, only the section of the machine to the right of hopper P, Fig. 1, is used and only the P clutch will be energized. A prepunched master card is placed at the bottom of the hopper P and fed from there under the punches 18 and over to the brushes 19. For gang punching, these checking brushes have a function other than checking. They have electrical connections to the punches 18, and when a perforation is sensed in a master card or a card 11 following thereafter, the next following blank card is perforated by punches 18 to duplicate the data on the preceding card. In this way an entire group of cards 11 is gang punched under control of the leading master card.

As will be explained in detail in connection with the wiring diagram, the punch master brushes 17 have electrical connections to the punches 18 and these brushes are adapted to sense cards and control punching on the cards when they read the punches 18. It is this type of operation of the main punching machine that is used to carry out the principles of the present invention.

Figure 4:
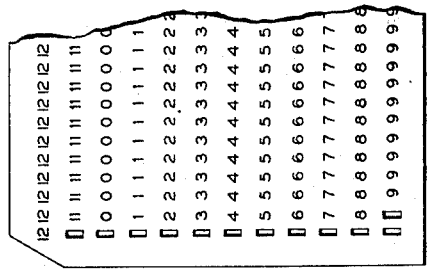
Fig. 4 is a detail view of a portion of a record card.

Fig. 4 shows a portion of a perforated card. Such a card may act as a master card or a detail card. It is noted that the card is perforated in 11 out of the 12 index point positions in column 1 and in the 9 index point position in column 2.

Where the terms "record card column" and "index points" appear in the claims, it will be understood that they mean that the record card is divided into parallel columns (as illustrated in Fig. 8) each column having nine or more different positions or index points. Each index point represents a different value by virtue of its location from a reference edge of the card, so that when a perforated card is analyzed by passing it through a tabulating machine in a columnar direction, or analyzed at rest, the index points will control associated representing devices. The term "record card column containing index points" is, therefore, defined as a card column containing a series of different index points having varying control functions by virtue of their differential locations in the column.

*Run-in operation of machine in connection with wiring diagram*

Referring to Fig. 2a, when the main switch is closed 110 volts A. C. is applied across the transformer T and rectifier R to provide a source of 40 volts D. C. across the two main lines 200 and 201 of the machine. The customer or detail cards are inserted in the feed hopper P with their 12 edge leading and the feed hopper R remains empty since in the application of the present invention only the punch side of the machine is used. The cards in hopper P operate the hopper lever PHL, closing contacts PHC, and energizing relay R4 by a circuit which extends from line 200, wire 202, contacts PHC, relay R4, wire 203 and line 201. Next the start key is depressed to complete a circuit from line 200, wire 202, the start key, the pick coil of relay R19, wire 203 and line 201. Energization of relay R19 closes contacts R19a and completes a circuit from line 200, wire 204, normally closed contacts R18b, contacts R19a, now closed, the normally closed contacts R12b, the pick coil of relay R24 and line 201. Although relay R4 is energized during operation of the punch side of the machine, it does not affect this circuit in a gang punching type of operation since the relay R4d contacts are shunted by the R12b contacts. Contacts R4d are used in a reproducing operation where the reproduce plug hubs are plug connected to energize relay R12.

Upon energization of relay R24, a circuit is completed from line 200, wire 205, contacts R24c, now closed, the pick coil of motor relay RHD1 and line 201. The energization of the motor relay RHD1 closes contacts RHD1a and operates motor M through the 110 volt lines 206 and 207. A circuit is also completed from line 200, wire 208, cam contacts P5, contacts R24a, now closed, the hold coil of relay R24 and line 201. A relay R26 is energized in parallel with relay R24 when C8 is closed from 7.5 to 9.0 of each cycle. Relay R26 will hold through a circuit which extends from line 200, cam contacts C3, contacts R26a, now closed, the hold coil of relay R26 and line 201. As a result during the first machine cycle the punch clutch magnets PCM are energized by a circuit which extends from line 200, contacts R26e, now closed, contacts R24d, now closed, the normally closed side of contacts R1b, cam contacts C1, punch clutch magnets PCM and line 201. A parallel circuit to the punch clutch magnets PCM exists during the first cycle and all subsequent cycles. This circuit extends from line 200, contacts R26a, now closed, contacts R24d, now closed, wire 210, the normally closed side of contacts R12c, cam contacts C1, the punch magnets PCM and line 201. With no cards in the read side of the machine, relays R6 and R7 remain de-energized, and contacts R6e and R7e prevent any circuits from being completed to the read clutch magnets RCM.

Through the clutch connection thus made, the punch picker is operated to feed the first card out of the hopper P and between the first set of feed rolls 103, 104. Since relays R6 and R7 remain de-energized, the circuit for holding relay R24 for continuous operation of the motor M will differ from the circuit used when reproducing. However, as in reproducing, it is necessary to hold the start key depressed until a card reaches and closes the punch brush card lever PBCL. With a card at the card lever PBCL there will also be a card at the die card lever DCL to close this card lever and a circuit will be completed from line 200, wire 202, die card lever contacts DCLC and punch brush contacts PBC, relays R1 and R10, wire 203 and line 201. A continuous holding circuit for relay R24 now extends from line 200, wire 204, contacts R18b, the normally closed side of contacts R6d, contacts R4a, now closed, the normally closed side of contacts R7b, the transferred contacts R10b, contacts R1a, now closed, contacts R4b, now transferred, contacts R24a, now closed, the hold coil of relay R24 and line 201. The motor M will now keep running and cards will be fed as long as they are present or until a stop key is depressed. Depression of the stop key will complete a circuit from line 200, the stop key, relay R18, wire 203 and line 201. The energization of relay R18 would open the contacts R18b to drop out relay R24 and thereby stop the machine.

*Punching of "9" in column A*

Assume that a customer card is being fed through the machine which is void of punchings in a field comprising the first three columns A, B and C. It is desired then to automatically punch the lowest index position in column A of the card, which is the 9 index point position, to indicate shipment of the first book to that customer.

Figure 3:
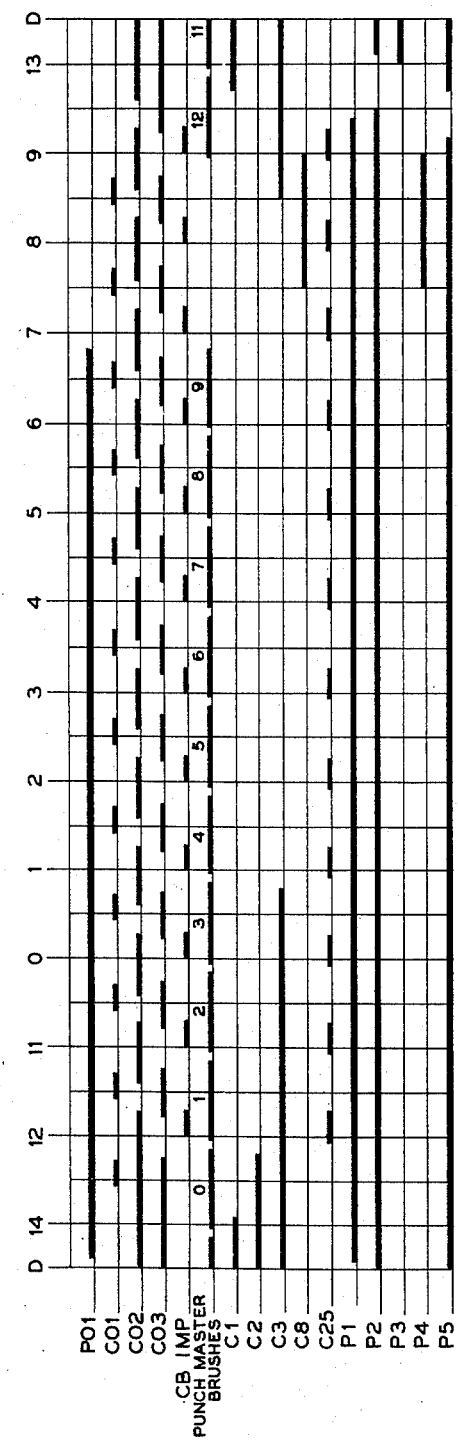
Fig. 3 is a timing diagram showing the timing of the cam operated contacts.

To condition the machine for carrying out the novel principles of the present invention, a pair of over punching switch hubs (Fig. 2b) are connected by plug wire 211 and a circuit is completed from line 200, cam contacts PO1, over punching switch and plug wire 211, the pick coil of relay RO4 and line 201. Contacts of relay RO4 are used to control the sensing circuits through the punch master brushes 17. It will be remembered that the brushes 17 are disposed the equivalent of three index point positions in advance of the punches 18. The contacts RO4k in the normal position serve to close the circuit to the brushes for the impulse from contacts P3 which occurs from 13.0 to 13.5 time in the cycle and which is the time in the cycle when an "11" punching in the card would be sensed at the brushes 17, as shown in Fig. 3. When contacts RO4k are transferred they close a circuit from the contacts CO1 to the brushes to provide a circuit for reading a "0" punching in the card at 14.4 to 14.7 time, a "1" punching from 12.4 to 12.7 time and so on through a "9" punching from 6.4 to 6.7 time. The contacts RO4a, b, c, . . . f in the normal position close the circuit to the X hubs to read out any "11" punchings in the card and transfer at 13.6 to 6.8 time to transfer the reading circuit to the Digit Exit hubs to read out the digit punchings 0–9.

When the card passes the brushes 17 the absence of an "11" punching in column 1 (column A) of the card will prevent a circuit from being completed from the cam contacts P3 through the brushes to the X hub for column 1 and relay R51 will not be energized. As a result, the relay contacts R54a for selector 1 will remain in their normal position. At 7.5 time in the reading cycle after all of the index point positions on the card have been tested by the brushes 17, cam contacts P4 close to complete a circuit from line 200, cam contacts P4, the 8 impulse hub, plug wire 212, the second common hub C of selector 2, the normally closed side of contacts R59b, the second normal hub N, plug wire 213, the selector control hub A, the first pick coil of relay RO1 and line 201. Relay RO1 holds through a circuit which extends from line 200, cam contacts P1, cam contacts CO2, contacts RO1a, now closed, the hold coil of relay RO1, wire 214 and line 201.

At 8 time in the cycle a circuit is completed from line 200, cam contacts C25, contacts RO1b, now closed, wire 215, the pick coil of relay RO2 and line 201. A parallel circuit is completed from the RO1b contacts, the selector impulse hub, plug wire 216, the P hub for relay R56, the pick coil of relay R56 and line 201. Relay RO2 will hold through a circuit which extends from line 200, cam contacts P1, cam contacts CO3, contacts RO2a, now closed, the hold coil of relay RO2, wire 214 and line 201. The hold circuit for relay R56 extends from line 200, wire 217, cam contacts P2, contacts R56a, now closed, the hold coil of relay R56 and line 201. A parallel circuit also extends from the cam contacts P2, through the contacts R56b, the pick coil of relay R59 and line 201. The energization of relay R59 transfers contacts R59a and R59b to transfer selector 2. However, the transfer of selector 2 has no particular significance at this time because the card being sensed is void of punchings.

At 8.4 time a circuit is completed from line 200, cam contacts P1, cam contacts CO1, contacts RO2b, now closed, the pick coil of relay RO3, wire 214 and line 201. At 9 time in the cycle when the 9 index point position on the customer card is beneath the punches 18, a circuit is completed from line 200, cam contacts C25, contacts RO3b, now closed, the punch impulse hub, plug wire 218, the second common hub C of selector 1, the normally closed side of contacts R54b, the second normal hub N, plug wire 219, punch entry hub A for column A, the punch magnet PM and line 201. Accordingly, a punching is made in the 9 index point position in column A of the blank customer card and the card feeds out to a suitable stacker.

*Punching of "8" in column A*

Since the card now has a 9 punching in column A, the next time it is passed through the machine an "8" will be punched in column A. This is accomplished by the following sequence of circuits: Since on the second run there is as yet no 11 punching in column A, relay R51 will not be energized and selector 1 will remain normal. At 6.4 time in the reading cycle the "9" hole in column A is sensed and a circuit is completed from line 200, cam contacts P1, cam contacts CO1, die card lever relay contacts R1e, now closed, contacts RO4k, now transferred, common brush 220, contact roll 1021, 9 hole in column A, brush 17, contacts RO4a, now transferred, digit exit hub 1, plug wire 221, first normal hub N of selector 1, the normally closed side of contacts R54a, the first common hub C of selector 1, plug wire 222, the first common hub C of selector 2, the normally closed side of contacts R59a, the first normal hub N of selector 2, plug wire 223, the selector control hub B, the second pick coil of relay RO1 and line 201.

At 7 time in the cycle a circuit is again completed, in the manner previously described, to simultaneously energize relays RO2 and R56. Selector 2 again transfers and this time it serves to prevent the punching of another 9 hole in column A of the card by opening the circuit path from the 8 impulse hub. At 7.4 time a circuit is completed from line 200, cam contacts P1, cam contacts CO1, contacts RO2b, now closed, the pick coil of relay RO3, wire 214 and line 201. Relay RO3 will hold until 8.3 time in the cycle through a circuit which extends from line 200, cam contacts P1, cam contacts CO2, contacts RO3a, now closed, the hold coil of relay RO3, wire 214 and line 201. Now when the 8 index point position on the card is beneath the punches 18, a circuit is completed from line 200, cam contacts C25, ontacts RO3b, now closed, the punch impulse hub, plug wire 218, the second common hub C of selector 1, the normally closed side of contacts R54b, the second normal hub N of selector 1, plug wire 219, punch entry hub A for column A, punch magnet PM and line 201.

The above operation is repeated each time the card is passed through the machine until the 7 through 11 index point positions in column A have been punched.

*Punching of "9" in column B*

With the 9 through 11 index point positions in column A punched, it is desired on the next run of the card through the machine to switch the punching to column B and also to start the first punch in column B at the 9 index point position. As the card passes the brushes 17, the 11 punching in column A is sensed at 13.0 time in the cycle and a circuit is completed from line 200, cam contacts P3, contacts R1c, now closed, the normally closed side of contacts RO4k, common brush 220, contact roll 1021, the 11 hole in column A, brush 17, the normally closed side of contacts RO4a, the X hub, plug wire 224, the P hub, the pick coil of relay R51 and line 201. Relay R51 holds through a circuit which extends from line 200, wire 217, cam contacts P2, contacts R51a, now closed, the hold coil of relay R51 and line 201. A parallel circuit extends from the cam contacts P2, contacts R51b, the pick coil of relay R54 and line 201. Energization of relay R54 transfers the contacts R54a and R54b of selector 1.

Since there are no punchings in column B of the card, the following circuits are completed in the same manner as was previously described in connection with punching the 9 index point position in column A: At 7.5 time cam contacts P4 close to complete the circuit through the normally closed contacts of selector 2 and the selector control hub A to energize the first pick coil of relay RO1. At 8 time cam contacts C25 close to complete the circuit through contacts RO1b to energize relay RO2 and to also cause selector 2 to transfer. At 8.4 time cam contacts P1 and CO1 close to cause the energization of relay RO3. Now with the above circuits completed, at 9 time in the cycle when the 9 index point position on the card is passing beneath the punches 18 a circuit is completed from line 200, cam contacts C25, contacts RO3b, now closed, the punch impulse hub, plug wire 218, the second common hub C of selector 1, contacts R54b, now transferred, the second transfer hub T of selector 1, plug wire 225, the first common hub C of selector 3, the normally closed side of contacts R94a, the second normal hub N of selector 3, plug wire 226, the punch entry hub B for column B, punch magnet PM and line 201. Accordingly, the 9 index point position in column B is punched. It will be noted that the punching circuit for all of the index point positions in column A is completed through the normal contact points of selector 1 whereas the punch circuit for punching the 9 index point position in column B is completed through the transferred contact points of selector 1 and the normal contact points of selector 3.

*Punching of "8" through "11" in column B*

The sensing and punching of column B of the card is accomplished in substantially the same manner as it was for column A except that when the card is sensed for the last position punched in column B the first hole that will be encountered will be the punching in the 11 index position in column A since the card feeds 12 edge first. As was previously described, the sensing of the 11 hole in column A serves to transfer selector 1 and as a result the circuit for energizing the second pick coil of relay RO1 upon sensing a punching in column B will now take a path from the second brush 17, contacts RO4b, now transferred, Digit Exit plug hub 2, plug wire 227, the second normal hub N of selector 3, normally closed side of contacts R94b, second common hub C of selector 3, plug wire 228, first transfer hub T of selector 1, contacts R54a, transferred, the first common hub C of selector 1, plug wire 222 and through the normal side of selector 2 to the second pick coil of relay RO1.

Energization of relays RO2 and RO3 and the transfer of selector 2 occurs in the same manner as previously described.

The circuit for punching the 8 through 11 index point positions in column B takes the same path described in connection with the punching of the 9 utilizes the transferred side of selector 1 and the normal side of selector 3.

*Punching of column C*

When columns A and B have been punched the next punch on the card is to be directed to the 9 index point position in column C. As was previously described, the sensing of the 11 punch in column A caused the transfer of selector 1. In similar fashion, the sensing of the 11 punch in column B causes the energization of relays R91 and R94 and therefore the transfer of selector 3. Now the circuit at 9 time is directed from the punch impulse hub through the transferred side of selector 1, the transferred side of selector 3, the punch entry hub C for column C, punch magnet PM and line 201.

The sensing circuit for column C similarly passes through the transferred sides of selectors 1 and 3 to again energize the second coil of relay RO1 and the punching circuits for punching the 8 through 11 index point positions in column C also pass through the transferred sides of selectors 1 and 3 in the same fashion as the 9 punching circuit.

It can be readily seen that the present invention is not necessarily limited to three columns but that an additional number of columns, may be punched merely by plug connecting an additional class selection device into the circuit for each additional column.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, the combination of a punching means, means for analyzing record cards having columns of index point positions, means for feeding said cards continuously in a given direction past said analyzing means and said punching means successively, cyclically operable means for operating said punching means, means selectively connecting said punch operating means with said punching means for punching in a selected column in said card, control means under control of said analyzing means normally rendering said punch operating means ineffective, and means for operating said control means whenever a blank record card passes said analyzing means to render the punch operating means effective and cause said punch means to punch a predetermined index point position in the selected column of said blank record card.

2. In a machine of the class described, the combination of a punching means, means for analyzing record cards having columns of index point positions, means for feeding said cards continuously in a given direction past said analyzing means and said punching means successively, cyclically operable means for operating said punching means, means selectively connecting said punch operating means with said punching means for punching in a selected column in said card, control means under control of said analyzing means normally rendering said punch operating means ineffective, and means for operating said control means whenever a blank record card passes said analyzing means to render the punch operating means effective and cause said punch means to punch in a selected column an index point position nearest one edge of said blank record card.

3. In a machine of the class described, the combination of a punching means, means for analyzing record cards having columns of index point positions, means for feeding said cards past said analyzing means and said punching means, cyclically operable means for operating said punching means, means selectively connecting said punch operating means with said punching means for punching in a selected column in said card, control means under control of said analyzing means normally rendering said punch operating means ineffective, and means for operating said control means whenever a blank record card passes said analyzing means to render the punch operating means effective and cause said punch means to punch in a selected column the index point position nearest the trailing edge of said blank record card.

4. In a machine of the class described, the combination of a punching means, means for analyzing record cards having columns of index point positions, means for feeding said cards past said analyzing means and said punching means with the highest index point position on the card leading, cyclically operable means for operating said punching means, means selectively connecting said punch operating means with said punching means for punching in a selected column in said card, control means under control of said analyzing means normally rendering said punch operating means ineffective, and means for operating said control means whenever a blank record card passes said analyzing means to render the punch operating means effective and cause said punch means to punch the lowest index point position in a selected column of said blank record card.

5. In a machine of the class described, the combination of a punching means, means for analyzing record cards having columns of index point positions, means for feeding said cards continuously in a given direction past said analyzing means and said punching means successively, cyclically operable means for operating said punching means, control means under control of said analyzing means, column selection means under control of said analyzing means, said control means being operable to connect said punch operating means with said column selection means, said column selection means being connected to said punching means, and means for operating said control means whenever a blank record card passes said analyzing means to connect said punch operating means with said selection means and effect the punching of a predetermined index point position in a selected column of said blank record card.

6. In a machine of the class described, the combination of a punching means, means for analyzing a selected column of index point positions in record cards, means for feeding said cards past said analyzing means and said punching means with the highest index point position on the card leading, cyclically operable means for operating said punching means, means selectively connecting said punch operating means with said punching means for punching in said selected column in said card, control means under control of said analyzing means, and means under control of said control means for normally rendering said punch operating means ineffective, said last named means being operable by said control means upon the analyzing of a punched index point position in said selected column for rendering said punch operating means effective to cause the punching of the next higher index point position than the one sensed in said selected column.

7. In a machine of the class described, the combination of a punching means, means for analyzing a selected column of index point positions in a record card, means for feeding said card past said analyzing means and said punching means, selection means normally controlling said punch means for punching in said selected column, means controlled by said analyzing means upon the analyzing of a perforation in a predetermined index point position of said selected column for switching said selection means to effect punching in a different column of said card, and cyclically operable means for operating said punching means to punch a predetermined index point position in said different column.

8. In a machine of the class described, the combination of a punching means, means for analyzing a selected column of index point positions in a record card, means for feeding said card past said analyzing means and said punching means with the highest index point position on the card leading, selection means normally controlling said punch means for punching in said selected column, means controlled by said analyzing means upon the analyzing of a perforation in a predetermined index point position of said selected column for switching said selection means to effect punching in a different column of said card, and cyclically operable means for operating said punching means to punch the lowest index point position in said different column.

9. In a machine of the class described, the combination of a punching means, means for analyzing a selected column of index point positions in a record card, means for feeding said card past said analyzing means and said punching means, means under control of said analyzing means for operating said punching means whenever a blank record card passes said analyzing means to cause punching of a predetermined index point position of said selected column, a second means under control of said analyzing means upon analyzing a punched index point position in said selected column for operating said punching means to punch an adjacent index point position to the one analyzed, and a third means under control of said analyzing means upon analyzing a perforation in a predetermined index point position of said selected column for causing said punching means to punch a predetermined index point position in a different column of the record card.

10. In a machine of the class described, the combination of a punching means, means for analyzing a selected column of index point positions in a record card, means for feeding said card past said analyzing means and said punching means with the highest index point position on the card leading, means under control of said analyzing means for operating said punching means whenever a blank record card passes said analyzing means to cause punching of the lowest index point position of said selected column, a second means under control of said analyzing means upon analyzing a punched index point position in said selected column for operating said punching means to punch the next higher index point position than the one analyzed, and a third means under control of said analyzing means upon analyzing a perforation in a predetermined index point position of said selected column for causing said punching means to punch the lowest index point position in a different column of the record card.

11. In a machine of the class described, the combination of a punching means, means for analyzing a selected column of index point positions in a record card, means for feeding said card past said analyzing means and said punching means with the highest index point position on the card leading, cyclically operable means for operating said punching means, selection means normally connecting said punch operating means with said punching means for punching in said selected column in said card, control means under control of said analyzing means normally rendering said punch operating means ineffective, a second selection means connected between said first selection means and said punching means for effecting punching in a different column of said card, means under control of said analyzing means upon the analyzing of a perforation in a predetermined index point position of said selected column for switching said first selection means to connect said punch operating means with said second selection means, and cyclically operable means for operating said control means to render the punch means effective to punch the lowest index point position in said different column of said card.

12. In a machine of the class described, a combination of a punching means, means for analyzing a selected column of index point positions in a record card, means for feeding said card past said analyzing means and said punching means, cyclically operable means for operating said punch means to punch index point positions in said selected column of the card, control means normally rendering said punch operating means ineffective, switching means, first operating means controlled by said switching means for operating said control means to effect punching in a predetermined index point position in said selected column, second operating means controlled by said analyzing means and said switching means for operating said control means to effect punching in the remaining index point positions in said selected column, and means operable when punching in any of the remaining index point positions in said selected column for preventing operation of said control means by said first operating means.

References Cited in the file of this patent

UNITED STATES PATENTS

| | | |
|---|---|---|
| Re. 21,133 | Lake | June 27, 1939 |
| 1,761,741 | Peirce | June 3, 1930 |
| 1,881,090 | Moulton | Oct. 4, 1932 |
| 2,007,391 | Bryce | July 9, 1935 |
| 2,111,116 | Holzapfel | Mar. 15, 1938 |
| 2,278,118 | Pitman | Mar. 31, 1942 |
| 2,678,098 | Morris | May 11, 1954 |